United States Patent
Shen et al.

(10) Patent No.: US 10,667,980 B2
(45) Date of Patent: Jun. 2, 2020

(54) MOTORIZED ROBOTIC WALKER GUIDED BY AN IMAGE PROCESSING SYSTEM FOR HUMAN WALKING ASSISTANCE

(71) Applicant: THE BOARD OF TRUSTEES OF THE UNIVERSITY OF ALABAMA, Tuscaloosa, AL (US)

(72) Inventors: Xiangrong Shen, Tuscaloosa, AL (US); Tao Shen, Kent, OH (US); Md Rayhan Afsar, Tuscaloosa, AL (US); Cang Ye, Little Rock, AR (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 0 days.

(21) Appl. No.: 16/367,406

(22) Filed: Mar. 28, 2019

(65) Prior Publication Data
US 2019/0298600 A1    Oct. 3, 2019

Related U.S. Application Data

(60) Provisional application No. 62/649,272, filed on Mar. 28, 2018.

(51) Int. Cl.
*A61H 3/04*    (2006.01)
*G05D 1/02*    (2020.01)
*B60L 50/52*    (2019.01)

(52) U.S. Cl.
CPC .............. *A61H 3/04* (2013.01); *G05D 1/0246* (2013.01); *A61G 2200/36* (2013.01); *A61H 2003/043* (2013.01); *B60L 50/52* (2019.02); *B60L 2200/24* (2013.01)

(58) Field of Classification Search
CPC ............................ A61H 3/04; A61H 2003/043
See application file for complete search history.

(56) References Cited

U.S. PATENT DOCUMENTS

| | | | | |
|---|---|---|---|---|
| 4,443,902 A | * | 4/1984 | Baer | A61G 7/1017 280/304.1 |
| 4,463,817 A | * | 8/1984 | Mennesson | A61H 3/04 180/65.51 |
| 4,809,804 A | * | 3/1989 | Houston | A61G 5/1051 180/65.51 |
| 4,922,940 A | * | 5/1990 | Lewy | A61H 3/00 135/67 |
| 5,137,102 A | * | 8/1992 | Houston, Sr. | A61G 5/042 180/65.51 |
| 5,313,735 A | * | 5/1994 | Latouche | A01K 87/08 43/25 |
| 5,411,044 A | * | 5/1995 | Andolfi | A61G 7/1017 135/66 |

(Continued)

*Primary Examiner* — John D Walters
*Assistant Examiner* — James J Triggs
(74) *Attorney, Agent, or Firm* — Meunier Carlin & Curfman LLC

(57) ABSTRACT

A motorized robotic walker is capable of moving automatically with the user through an algorithmic process using a 3D camera image processing system. The image processing system can measure relative motion of the user versus the robotic walker and a microprocessor can generate PWM signal to drive motors of the robotic walker so that the robotic walker can follow the user's motion automatically and provide assistance if needed.

13 Claims, 9 Drawing Sheets

(56) References Cited

U.S. PATENT DOCUMENTS

| | | | | |
|---|---|---|---|---|
| 5,794,639 | A * | 8/1998 | Einbinder | A61H 3/04 |
| | | | | 135/67 |
| 6,378,883 | B1 * | 4/2002 | Epstein | A61G 5/04 |
| | | | | 180/6.5 |
| 9,649,236 | B1 * | 5/2017 | Wike, Jr. | A61G 5/14 |
| 9,770,391 | B2 * | 9/2017 | Park, IV | B65D 83/0409 |
| 10,080,701 | B1 * | 9/2018 | Bagheri | A61H 3/04 |
| 2017/0209319 | A1 * | 7/2017 | Fawcett | A61H 3/04 |

* cited by examiner

MOTORIZED ROBOTIC WALKER GUIDED BY AN IMAGE PROCESSING SYSTEM FOR HUMAN WALKING ASSISTANCE

CROSS REFERENCE TO RELATED APPLICATIONS

This application is a non-provisional of Application Ser. No. 62/649,272, filed Mar. 28, 2018, which is pending and is hereby incorporated by this reference in its entirety.

ACKNOWLEDGEMENTS

This invention was made with government support under Grant No. R01 NR016151 awarded by the National Institutes of Health. The government has certain rights in the invention.

BACKGROUND

Field of the Invention

Embodiments of the present invention relate to a mobility assistance device, specifically a motorized robotic walker guided by an image processing system.

Background

Impaired mobility is ranked to be one of the most important factors that have both physical and mental impacts on the patients' life. The impacts are especially serious for the rapidly expanding elderly population in the United States, which is expected to reach 71 million, approximately 20% of the U.S. population, by 2030. Existing assistive tools, such as a cane or a walker/rollator, are helpful for such mobility-challenged individuals by providing additional support in walking. However, such tools also disrupt the users' walking rhythm and increase their metabolic energy consumption. Wheelchairs, especially powered wheelchairs, are also used extensively among this population. Although wheelchairs are effective in transporting patients, they largely preclude the users' lower limb muscle activities and bone load-carrying and accelerate the musculoskeletal degeneration of the user's lower limb.

To address the issues with existing assistive tools, a new motorized robotic walker for the mobility-challenged users is described herein. Unlike similar robotic walkers in prior works, no wearable sensors are required for the user. Impaired mobility has both physical and mental impacts on the patients' life. Impacts are especially serious for the rapidly expanding elderly population in the USA. The problem also happens on handicapped people (e.g., stroke and SCI). Conventional walker/rollators are usually passive and, require user to pick up and push walker forward. Walker/rollator disrupts the users' walking rhythm and increases their energy consumption. Wheelchairs largely preclude the users' lower limb muscle activities and accelerate the musculoskeletal degeneration of user's lower limb

BRIEF SUMMARY OF THE DISCLOSURE

Accordingly, the present invention is directed to a motorized robotic walker for providing non-contact measurement of a user that obviates one or more of the problems due to limitations and disadvantages of the related art.

In accordance with the purpose(s) of this invention, as embodied and broadly described herein, this invention, in one aspect, relates to a motorized robotic walker for providing non-contact measurement of a user to maintain a constant position relative to the user, includes a frame; at least two wheels disposed at a lower portion of the frame, each of the two wheels operatively connected to a motor; a 3D camera mounted on a portion of the frame, the camera capable of capture three-dimensional orientation and position information about the user; a processor for generating the wheel rotation angles in real time; and motor drivers for controlling a speed of the motor and direction of the at least two wheels to maintain relative position of the frame and the user based on the relative position data.

In another aspect, the method of operating a robotic motorized walker having a frame, at least two wheels disposed at a lower portion of the frame, each of the two wheels operatively connected to a motor, a camera mounted on a portion of the frame, the camera capable of capture three-dimensional orientation and position information about the user, a processor for generating wheel rotation information and driving the motors to maintain a substantially constant relative distance from a user, includes detecting the user's relative position and orientation relative to the walker using the 3D camera, conducting an inverse kinematic calculation using the user's relative position and orientation to determine equivalent wheel rotation angles for moving the at least two wheels; generating motor-control PWM signals for each of the motors to move the wheels according to the inverse kinematic calculation to maintain a substantially constant relative distance from a user wherein the camera is capable of generating both a color image and depth information.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the motorized robotic walker, as well as the structure and operation of the various embodiments of the motorized robotic walker, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate the motorized robotic walker. Together with the description, the figures further serve to explain the principles of the motorized robotic walker described herein and thereby enable a person skilled in the pertinent art to make and use the motorized robotic walker.

DETAILED DESCRIPTION

Figure 1:
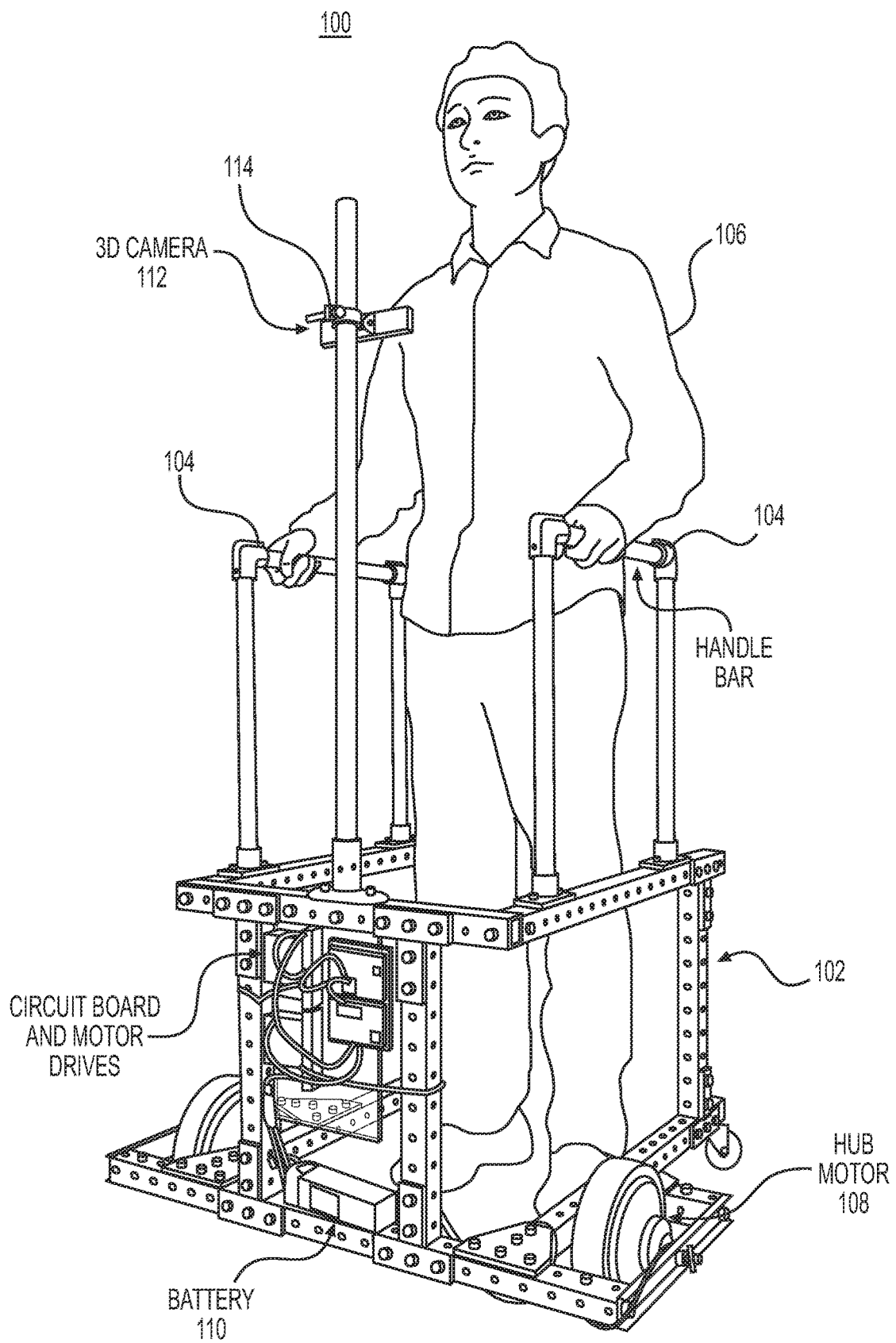
FIG. 1 is an exemplary (prototype) robotic walker according to principles of described herein.

Reference will now be made in detail to embodiments of the robotic motorized walker with reference to the accompanying figures, in which like reference numerals indicate like elements.

An exemplary (prototype) robotic walker according to principles described herein is shown in FIG. 1. The exemplary walker is beneficial because it is intended to 1) accompany the user in walking with its own power and maneuverability, and 2) provides safety protection and powered assistance (i.e., carrying the user forward) when needed. Additionally, the walker should be as light and simple as possible to facilitate its future use in patients' daily life.

With the objective of assisting the users' ambulation in a safe and convenient way, the robotic walker features two independently controlled wheels for the maneuverability of the robot, and two parallel bars for the user support in walking. A 3D computer vision system is used to measure the relative position of the user versus the robot, and the control commands are generated accordingly.

The prototype robotic walker ("robot") shown in FIG. 1 includes a commercial framing system, which was utilized to construct a base 102 to expedite the research. The base is not limited to this commercial framing system, but any appropriate base can be used. On the base 102, two parallel bars 104 were mounted using standard railing bars and hardware. Note that the back end of the robotic walker 100 is open, allowing the user 104 to enter and exit with no obstruction. With this configuration, the user 104 can walk at the center of the opening defined by a frame of the robotic walker 100, either freely without physical contact with the robotic walker 100 or holding the parallel bars 104 when additional support and/or power assist is needed. It should be noted that the base or platform of a motorized robotic walker as contemplated herein is not limited to the base used to construct the prototype. The platform, base or frame, may be of any feasible construction and may be of a height appropriate to the user's needs. The height of the frame may be adjustable. In an aspect, the handle bars are of a height sufficient to catch a person/user who might fall and need the support of the handle bars. The size of the frame is a trade off with the maneuverability of the robot.

As described below, the camera should be located to capture the appropriate data points. Thus, the physical parameters of the walker can be such that are tailored for the needs of classes of users so long as the data points can be appropriately captured. It is contemplated that the camera can be mounted lower or pointed to a location lower than the torso with appropriate data capture and algorithm implementation.

The frame may include a lightweight harness connected to the frame of the robot to provide stability to a user or keep the user from falling.

For the mobility of the robot, two independently controlled hub motors 108 are mounted at the front of the robot, and two caster wheels are mounted at the rear of the robot, e.g., for balance. In another configuration, the hub motors could be located to the rear of the robot and the casters at the front. It is conceivable that the robot could include four or more hub motors. In the presently-described prototype, the hub motors (280-1342M, Hub Motors, Rogers, Ariz.) are brushed permanent magnet DC motors with 180 W continuous power rating. Power output of the motors are regulated with two PWM servo drives (AZBDC20A8, Advanced Motion Controls, Camarillo, Calif.) (not shown), and onboard control calculation is implemented with a microcontroller (not shown). According to principles described herein, the robot may move at a velocity faster than the user. The robot moves by virtue of the hub motors, external battery 110, external control system and motor drive to control the speed of the motor in the prototype. The robot may include more than one battery. For example, batteries may be mounted adjacent the wheels at the sides of the robot.

To provide noncontact measurement of the user 106 versus the robot 100, a 3D computer vision system is implemented. In the prototype, an image is taken with a 3D camera 112 (Realsense R200, Intel, Santa Clara, Calif.) mounted at the front of the robot 100 through a mounting bracket 114 with adjustable height and orientation. This camera 112 is able to generate both color image and depth data frame at 640×480 resolution and 60 fps. Each depth data frame provides a 3D point cloud P of the user's upper body bounded by 100 (red and green points as shown in the sample image in FIG. 2). The user's torso data (green points) is extracted by segmenting the grey image obtained by projecting the point cloud data to an accumulator array on the horizontal plane. After detecting the Least-square Plane of the torso surface and its normal vector $''=\{n_x, n_y, n_z\}$, the relative orientation between the robot and the human can be obtained. The relative position can be obtained with a similar approach. In the prototype, the tracking algorithm is programed in an Up Board with Intel Atom processor running Ubuntu system, and a serial cable is used to transmit the position/orientation data to the microcontroller for robot motion control.

Figure 3:
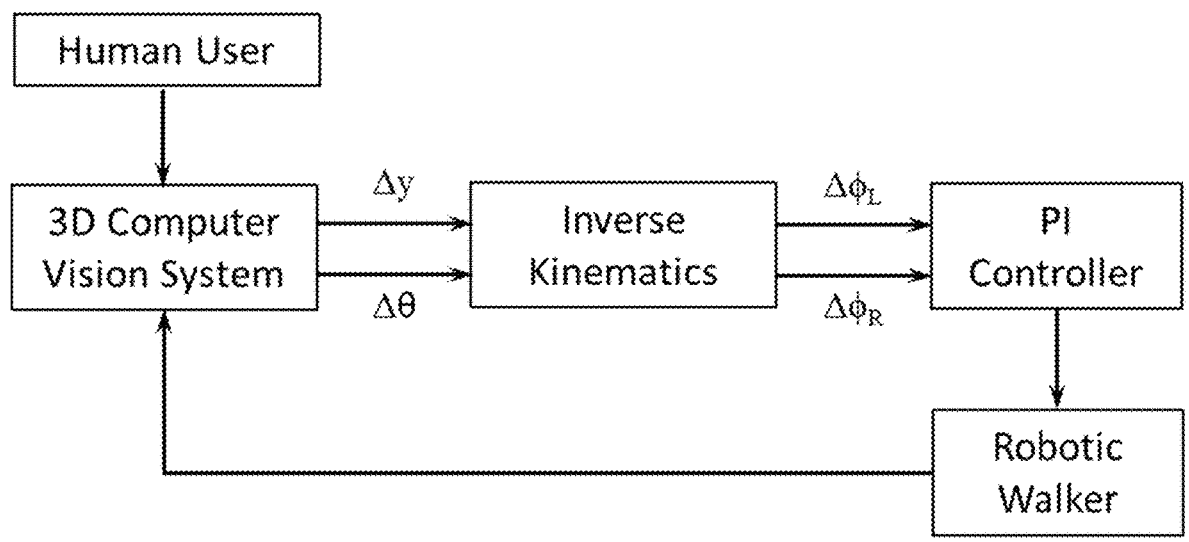
FIG. 3 illustrates a control system with a PI motion controller of the motorized robotic walker according to principles described herein.

For the real-time motion control of the robot 100, the goal is to maintain a constant relative position and a zero-degree orientation between the user and robot as much as practical. The relative position $\Delta y$ and orientation $\Delta\theta$ are measured with the 3D computer vision system described above, and inverse kinematic calculation is conducted to determine the equivalent wheel rotation angles $\phi L$ and $\phi R$ (i.e., the angles the wheels need to turn to eliminate the position and orientation errors). Subsequently, a proportional-integral (PI) controller is implemented for the control of each wheel, generating the motor-control PWM signals for the motor drives. For the implementation of the PI controller, a rotary magnetic encoder (AS5311, AMS, Premstaetten, Austria) is mounted on each wheel to provide real-time feedback of the wheel position. A block diagram of the control system is shown in FIG. 3.

Figure 2:
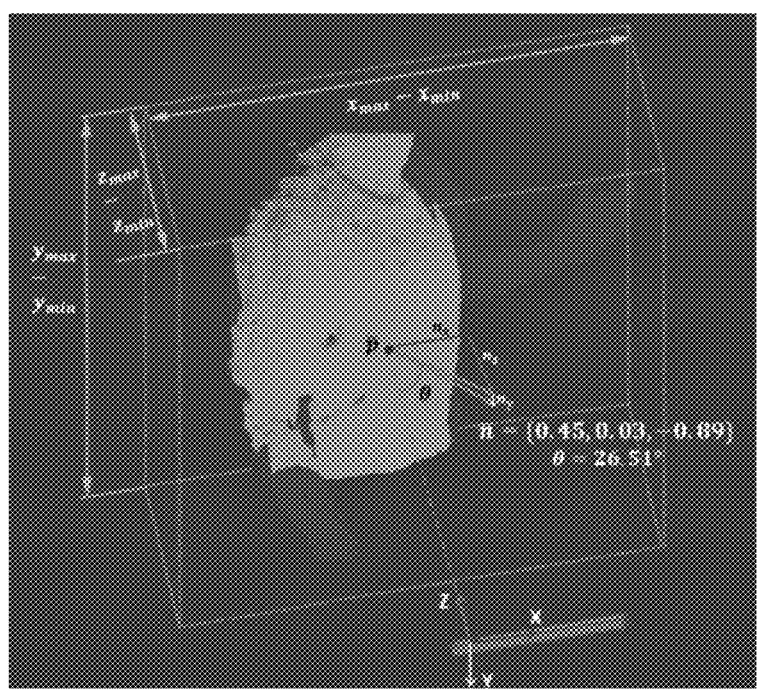
FIG. 2 illustrate data points extracted from an image captured by a 3D camera.

The prototype of the robotic walker was fabricated, and experiments were conducted to demonstrate the functionality of the robot in two major aspects. First, the 3D computer vision system was tested to measure the human orientation and position, and then the algorithm was simulated in the RealSense software. As shown in FIG. 2, the algorithm successfully calculated the orientation ($\theta=26.51°$) by processing the 3D image shown in FIG. 2. In lieu of the 3D camera, laser positioning, such as LIDAR, could be used to provide positional information to allow the motorized walker to maintain appropriate distance from a user and to avoid obstacles, as discussed below. In some cases, laser positioning might require the user to wear sensors or beacons to be sensed by the LIDAR.

Figure 4:
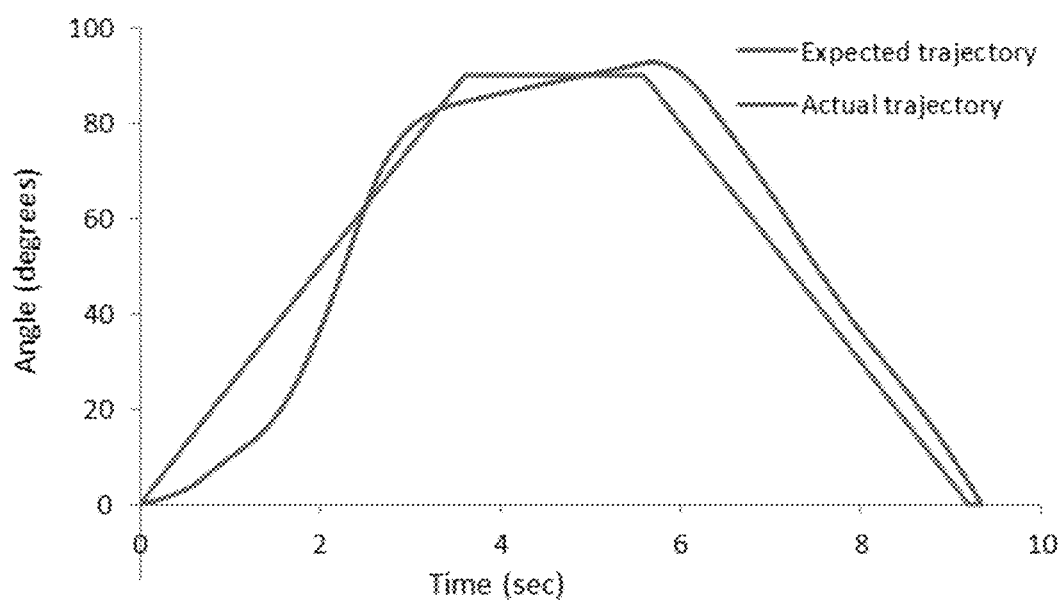
FIG. 4 shows control performance of the robot with a PI motion controller of the prototype in a turning experiment according to principles described herein.

The control performance is shown in FIG. 4, in which the robot was commanded to turn right by 90°, stay for 2 seconds, and turn back to the original orientation. As shown in FIG. 4, the prototype robot was able to track the desired orientation change. Some delay in tracking response exists, primarily due to the slip of the wheels on the ground, which limits the maximum gains that can be used in the PI controller.

Figure 5:
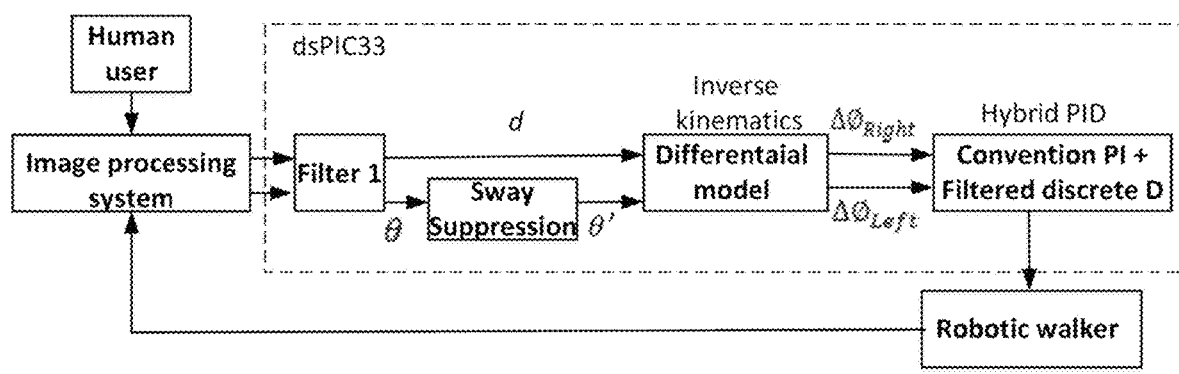
FIG. 5 illustrates a control system with filters, sway suppression function, and fully PID motion controller of the motorized robotic walker according to principles described herein.

In another implementation of the walker according to principles described herein, the motion controller includes an orientation signal preprocessing module for sway suppression and a hybrid proportional-integral-derivative (PID) controller with lower-pass filtered differentiation. A schematic of an exemplary motion controller according to this implementation is shown in FIG. 5.

Figure 6:
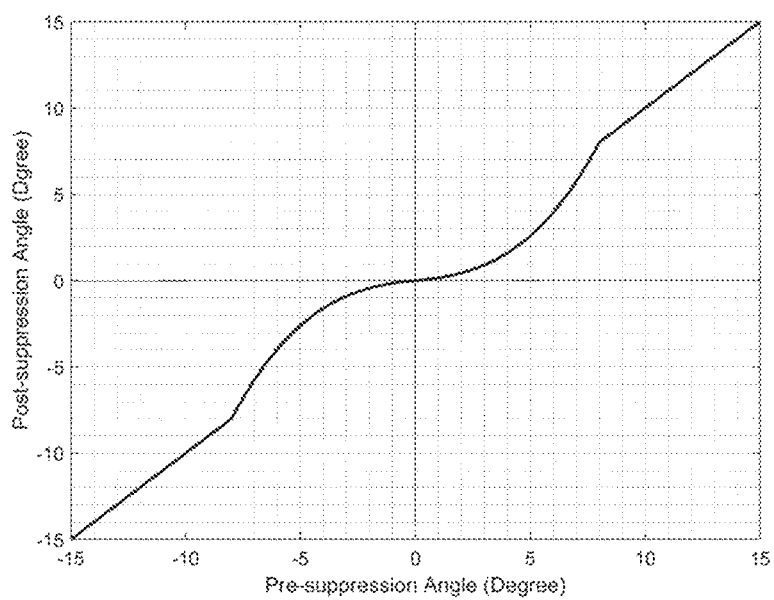
FIG. 6 illustrates comparison of the orientation angles pre-suppression versus post-suppression.

Sway suppression in which the negative effects of sway motion are reduced while the robot is still responsive to the user's turning motion are provided according to principles described herein. A suppression band is defined based on the angular range of the sway motion:

$$-\Theta \leq \theta \leq \Theta \quad (2)$$

where $\theta$ is the measured upper body orientation and $\Theta$ is the width of the suppression band, which can be determined through observation or tuning. Subsequently, a suppression function is defined, which meets the following requirements within the suppression band: 1) continuous; 2) symmetric with respect to the origin; 3) derivative close to zero around the origin; and 4) equal to the independent variable ($\theta$) at the boundary (to ensure the overall continuity). A simple solution adopted in this work is a $3^{rd}$-order polynomial, which provides sufficient flexibility in tuning. The overall output function is defined as:

$$\theta' = \begin{cases} a_3\theta^3 + \text{sgn}(\theta) \cdot a_2\theta^2 + a_1\theta & \text{when} \quad -\Theta \leq \theta \leq \Theta \\ \theta & \text{else} \end{cases} \quad (3)$$

where $\theta'$ is the output orientation angle (post-suppression), and $a_1/a_2/a_3$ are the tunable parameters. An example comparison of the orientation angles pre-suppression versus post-suppression is shown in FIG. 6. The post-suppression orientation signal $\theta'$, combined with the relative position in the longitude direction d, is used to calculate the desired wheel rotation angles through inverse kinematic calculation.

On the lower level, a wheel motion controller was developed to regulate the wheel rotation. A hybrid proportional-integral-derivative (PID) controller with lower-pass filtered differentiation is used.

A computer vision system according to principles described herein was validated through a comparison with the measurement results obtained with the standard marker-based motion capture system (MCS). Subsequently, the performance of the system was quantified through the experiments of simple human-initiated movements and navigation of an indoor environment tracking human movement.

Figure 7:
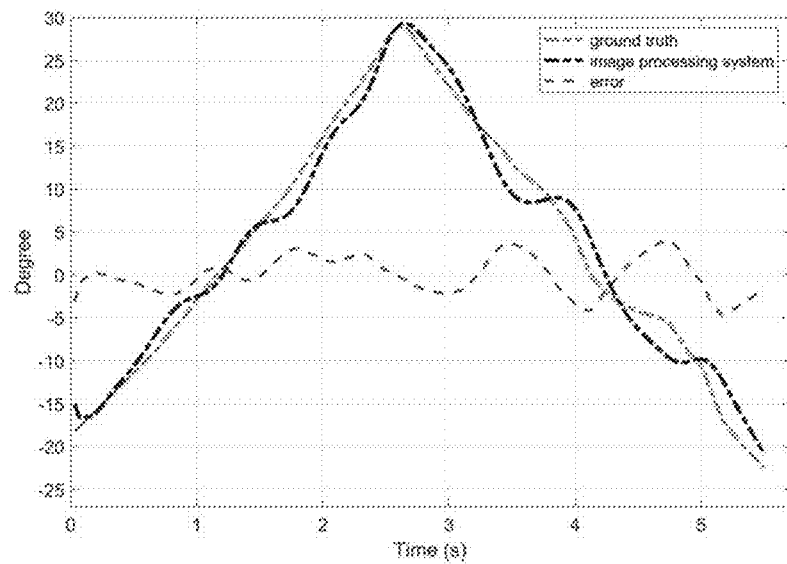
FIG. 7 shows measurement of the user's orientation: ground truth vs computer vision system in an experiment according to principles described herein.

To evaluate the performance of the computer vision system, an OptiTrack motion capture system (MCS) was used to obtain the ground-truth measurement of the user's orientation and position. As shown in FIG. 7, the estimation error is shown as the dashed red line. As can be observed in this figure, the measurement of the computer vision system matches the MCS measurement very closely: the root mean square (RMS) of the error is 2.16 degree and the maximum error is 4.14 degree. The result supports that the computer vision system is capable of computing the human orientation with small errors.

Figure 8:
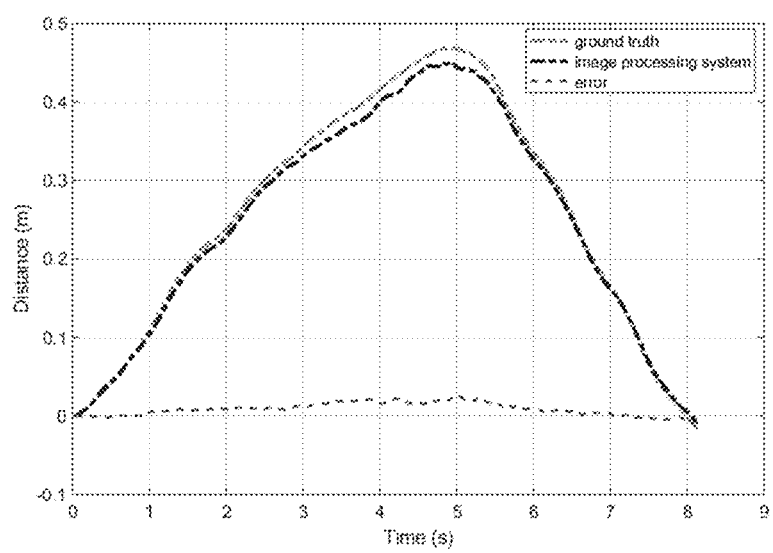
FIG. 8 shows Measurement of the user's fore-aft displacement: ground truth vs computer vision system in an experiment according to principles described herein.

The second experiment was conducted to evaluate the accuracy of the computer vision system for position detection. A human subject stood in the front of the camera about 1.3 m, then moved forward about 0.5 m and moved backward to the starting point. His walking speed was about 0.13 m/s. In this case, since the vertical and lateral displacements are negligible, only the position estimation along the fore-aft axis was compared. By setting the start point as the base point, the displacements of the human center estimated by the MCS and by the image processing system were plotted in FIG. 8. It shows that the human subject moves about 1 m in 8 seconds. The RMS of for the human center displacement is 0.012 m and the maximum error is 0.024 m. The result supports that the image processing system is capable of computing the human position with small errors.

Based on the validation results presented in the section above, it is reasonable to assume that the relative position and orientation captured by the computer vision system is sufficiently accurate for robot control purpose.

Experiments were conducted to evaluate the robot's performance in tracking a human user's continuous walking and turning movements. First, the human user walked forward in a straight line at a speed of approximately 1.0 m/s (a typical walking speed for older adults). The human-robot relative position (i.e., fore-aft movement tracking error) was recorded for 30 seconds, as shown in FIG. 9.

Figure 9:
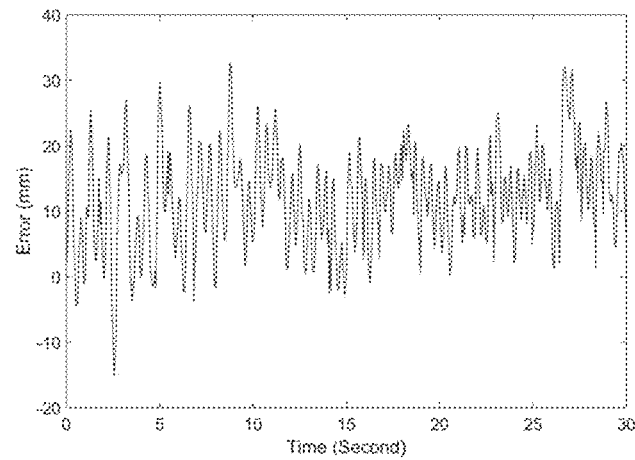
FIG. 9 shows human-robot relative position (i.e., fore-aft movement tracking error) in a straight-line walking experiment in an experiment with the controller in FIG. 5 according to principles described herein.

As can be seen in FIG. 9, the tracking error is very small compared with the overall movement, with the maximum at 30 mm and the average at 10 mm. The subject's feedback indicates that the controller was able to create a comfortable experience of the robot accompanying the user, despite the fact that the subject was constantly moving.

Figure 10:
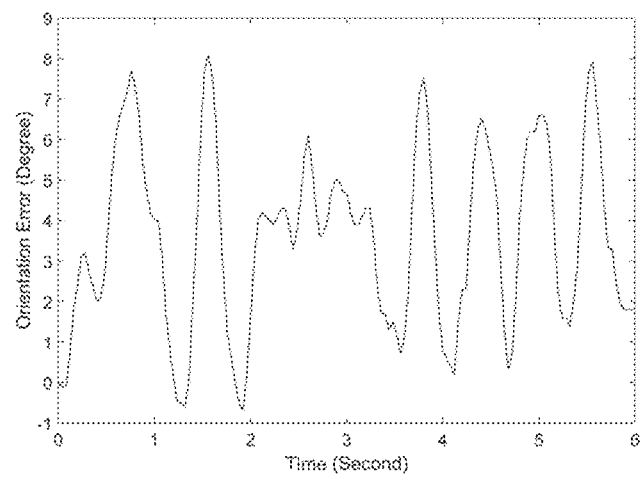
FIG. 10 shows human-robot relative orientation (i.e. turning tracking error) in a continuous turning experiment with the controller in FIG. 5 according to principles described herein.

A similar experiment was conducted for the robot to track a human's continuous turning movement. During the experiment, a human user made continuous turning movement by following a circle at a speed of approximately 60 degree/s. The human-robot relative orientation (i.e. turning tracking error) is shown in FIG. 10. Similar to the straight-line walking, the robot was able to change its orientation and effectively tracking the user's turning movement.

Figure 11:
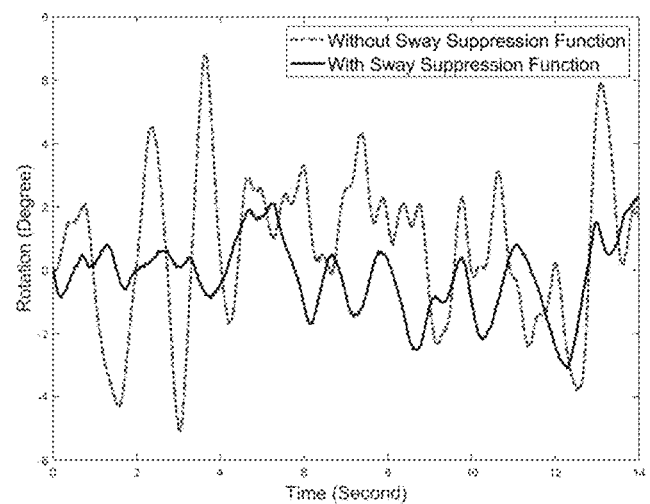
FIG. 11 shows Comparison of the robot orientation trajectories with and without sway suppression according to principles described herein.

Sway suppression, as described herein, may be a component of the robot controller. As such, a set of comparison experiments was conducted to evaluate its effectiveness in robot control. In the experiments, the test subject walked in a straight line at a speed of approximately 1 m/s, and the robot's sway movement is measured with and without the sway suppression algorithm implemented. For such measurement, an inertia measurement unit (MPU6050, InvenSense, San Jose, Calif.) was attached to the robot frame to measure its absolute orientation change. FIG. 11 shows the comparison of the robot orientation trajectories with and without sway suppression. It can be clearly observed that the magnitude of the robot sway reduced significantly after the sway suppression algorithm was applied.

Accordingly, the motorized robotic walker according to principles described herein is capable of moving automatically with the user through an algorithmic process to provide the assistance if needed. The motorized walker can provide walking assistance automatically if needed. It is the first time to use an image processing system to realize automatically navigation for a walker. Using automatic navigation reduces users' metabolic energy consumption.

Additionally, a light source can be used to allow for use in completely dark environments. The addition of a light source can assist with the image capture and provide the user the ability to see. Alternatively, the infrared information in the camera could be used in dark environments to enhance image capture.

Obstacle and planar object detection using sparse 3D information for a robot will assist the user and the user's mobility. Two cameras may be installed in front of the robot for road map and obstacle detection making use more practical by avoiding accidents with external objects.

Advantages expected according to principles of the present application include for users a positive health impact on users' physical and mental conditions and easy operation not addressed by current walkers or mobility assistance devices. The robotic walker according to principles described herein provides a novel application of imaging processing guidance in medical device.

Various publications have attempted to address issues with users in various ways, but none address the issues addressed by the present invention. Some background materials are provided in:

Mobile Walker, Monitoring and Information System (US20170354564A1) The monitor and information system is to measure vital parameters contains for instance heart frequency, blood pressure, blood oxygen content, blood sugar content and the ability of the user of the mobile walker to respond and move Zwibel, H., 2009, "Contribution of Impaired Mobility and General Symptoms to the Burden of Multiple Sclerosis." Advances in Therapy, vol. 26, no. 12, pp. 1043-1057.

The Merck Company Foundation, 2007, "The State of Aging and Health in America 2007," Whitehouse Station, N.J.: the Merck Company Foundation.

Lee, B., Ko, C., Ko, J., Kim, J. S., Lim, D., 2015, "Suggestion of New Concept for Mobility Assistive System Based on Wheelchair Platform with Gait Assistive Function Controlled by Artificial Pneumatic Muscle." Biomedical Engineering Letter, vol. 5, no. 2, pp. 87-91.

Homich, A. J., Doerzbacher, M. A., Tschantz, E. L., Piazza, S. J., Hills, E. C. and Moore, J. Z., 2015, "Minimizing Human Tracking Error for Robotic Rehabilitation Device." ASME Journal of Medical Devices, vol. 9, no. 4, p. 041003.

Qian, X., Ye, C., 2014, "NCC-RANSAC: A Fast Plane Extraction Method for 3D Range Data Segmentation," IEEE Transactions on Cybernetics, 44 (12), pp. 2771-2783.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Throughout this application, various publications may have been referenced. The disclosures of these publications in their entireties are hereby incorporated by reference into this application in order to more fully describe the state of the art to which this invention pertains.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A motorized robotic walker for providing non-contact measurement of a user to maintain a constant position relative to the user, comprising:
    a frame;
    at least two wheels disposed at a lower portion of the frame, each of the two wheels operatively connected to a motor;
    a 3D camera mounted on a portion of the frame, the camera capable of capturing three-dimensional orientation and position information about the user;
    a processor for generating the wheel rotation angles in real time; and
    motor drivers for controlling a speed of the motor and direction of the at least two wheels to maintain relative position of the frame and the user based on the relative position data.

2. The motorized robotic walker of claim 1, wherein the camera is capable of generating both color image and depth information.

3. The motorized robotic walker of claim 2, wherein the depth information is depth frame data.

4. The motorized robotic walker of claim 3, wherein the depth frame data is 3D point cloud P of a portion of the user's body.

5. The motorized robotic walker of claim 4, wherein the portion of the user's body is the user's upper body.

6. The motorized robotic walker of claim 1, wherein the processor generates PWM signals for driving the motors.

7. The motorized robotic walker of claim 6, further comprising a sensor on each of the at least two wheels to provide feedback to the processor of wheel position.

8. A method of operating a robotic motorized walker having a frame, at least two wheels disposed at a lower portion of the frame, each of the two wheels operatively connected to a motor, a camera mounted on a portion of the frame, the camera capable of capturing three-dimensional orientation and position information about the user, a processor for generating wheel rotation information and driving the motors to maintain a substantially constant relative distance from a user, the method comprising:
    detecting the user's relative position and orientation to the walker using the 3D camera, conducting an inverse kinematic calculation using the user's relative position and orientation to determine equivalent wheel rotation angles for moving the at least two wheels;

generating motor-control PWM signals for each of the motors to move the wheels according to the inverse kinematic calculation to maintain a substantially constant relative distance from a user;

wherein the camera is capable of generating both a color image and depth information.

9. The method of claim 8, wherein the depth information is depth frame data.

10. The method of claim 9, wherein the depth frame data is 3D point cloud P of a portion of the user's body.

11. The method of claim 10, wherein the portion of the user's body is the user's upper body.

12. The method of claim 11, wherein the processor generates PWM signals for the motor.

13. The method of claim 12, further comprising an encoder sensor on each of the at least two wheels to provide feedback to control the rotation of the wheels.

* * * * *